United States Patent
Chen et al.

(10) Patent No.: US 12,188,882 B2
(45) Date of Patent: Jan. 7, 2025

(54) METHOD AND DEVICE FOR CONTROLLING OUTPUT BEAM OF RAY MACHINE IN IMAGING SYSTEM, AND CT IMAGING SYSTEM

(71) Applicants: Nuctech Company Limited, Beijing (CN); Tsinghua University, Beijing (CN)

(72) Inventors: Zhiqiang Chen, Beijing (CN); Li Zhang, Beijing (CN); Yunda Sun, Beijing (CN); Zhenhua Zhao, Beijing (CN); Xin Jin, Beijing (CN); Le Shen, Beijing (CN); Wuyang Liang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 243 days.

(21) Appl. No.: 18/052,671

(22) Filed: Nov. 4, 2022

(65) Prior Publication Data

US 2023/0144259 A1 May 11, 2023

(30) Foreign Application Priority Data

Nov. 5, 2021 (CN) .......................... 202111310304.4

(51) Int. Cl.
*G01N 23/046* (2018.01)
*G01N 23/083* (2018.01)
*G06T 11/00* (2006.01)

(52) U.S. Cl.
CPC ......... *G01N 23/046* (2013.01); *G01N 23/083* (2013.01); *G06T 11/005* (2013.01);
(Continued)

(58) Field of Classification Search
CPC .............. G01N 23/046; G01N 23/083; G01N 2223/04; G01N 2223/419;
(Continued)

(56) References Cited

U.S. PATENT DOCUMENTS

| 4,118,730 | A | * | 10/1978 | Lemelson | ................ | G07D 7/12 |
| | | | | | | 386/300 |
| 4,171,476 | A | | 10/1979 | Waltham | | |

(Continued)

FOREIGN PATENT DOCUMENTS

| CN | 202235412 U | 5/2012 |
| CN | 203705363 U | 7/2014 |

(Continued)

OTHER PUBLICATIONS

Chinese Office Action received in Chinese Application No. 202111310304.4 as mailed Mar. 24, 2024, with English translation, in 11 pages.

(Continued)

*Primary Examiner* — Kiho Kim
(74) *Attorney, Agent, or Firm* — Knobbe Martens, Olson & Bear, LLP (57) ABSTRACT

The method includes: receiving an encoder signal and a ray machine output beam signal, and initially synchronizing the encoder signal and the ray machine output beam signal; recording coded value M of the encoder at moment $t_m$, and coded value N of the encoder at moment $t_{m+1}$, where M, N, and m are integers; determining that duration from the moment $t_m$ to the moment $t_{m+1}$ is an actual output beam time interval T of the ray machine, when it is determined that a difference value between the coded value M and the coded value N satisfies preset value a, a being an integer; determining gap time $T_G$ in the actual output beam time interval T based on a preset output beam time interval $T_J$ of the (Continued)

imaging system and the actual output beam time interval T; and controlling the ray machine not to emit beam within the gap time $T_G$.

16 Claims, 7 Drawing Sheets

(52) U.S. Cl.
 CPC ... *G01N 2223/04* (2013.01); *G01N 2223/419* (2013.01); *G01N 2223/643* (2013.01)
(58) Field of Classification Search
 CPC .. G01N 2223/643; G06T 11/005; H05G 1/38; H05G 1/30; G01V 5/226
 See application file for complete search history.

(56) References Cited

U.S. PATENT DOCUMENTS

| | | | |
|---|---|---|---|
| 4,951,222 A * | 8/1990 | Hoffman | G01N 23/046 |
| | | | 250/359.1 |
| 5,119,190 A * | 6/1992 | Lemelson | H04N 5/782 |
| | | | 348/162 |
| 2015/0062281 A1 | 3/2015 | Nishiyama | |

FOREIGN PATENT DOCUMENTS

| | | |
|---|---|---|
| CN | 104374783 A | 2/2015 |
| CN | 105030267 A | 11/2015 |
| CN | 105092610 | 11/2015 |
| CN | 109521480 A | 3/2019 |
| CN | 214409338 U | 10/2021 |
| JP | 2015-011239 A | 1/2015 |

OTHER PUBLICATIONS

Long, "Design of embedded synchronization system for high energy industry CT based on FPGA," Institute of Applied Electronics, vol. 23, No. 9, Sep. 2011, pp. 2499-2502 with English abstract.
Xiao, "Experiment research on high energy X-ray radiography based on digital flat-panel detector," Department of Engineering Physics, Tsinghua University, vol. 29, No. 6, Nov. 2003, pp. 660-663, with English abstract.
International Search Report and Written Opinion mailed Dec. 28, 2022 in International Application No. PCT/CN2022/124586, 11 pages.

* cited by examiner

METHOD AND DEVICE FOR CONTROLLING OUTPUT BEAM OF RAY MACHINE IN IMAGING SYSTEM, AND CT IMAGING SYSTEM

CROSS-REFERENCE TO RELATED APPLICATION

This application claims the priority of Chinese Patent Application No. 202111310304.4 filed on Nov. 5, 2021 in the China National Intellectual Property Administration, the disclosure of which is hereby incorporated herein by reference in entirety.

TECHNICAL FIELD

The present disclosure relates to a field of security inspection imaging technology, and in particularly, to a method and a device for controlling an output beam of a ray machine in an imaging system, a CT imaging system, an electronic apparatus, a storage medium and a program product.

BACKGROUND

Reconstruction of a CT image is based on a known precise geometry of a light source target point, a detector crystal, and a scanned object in the same coordinate system. To ensure the quality of a reconstructed image, a beam should be ensured to have a uniform sampling frequency in time and space as much as possible. Typically, a temporal sampling frequency is strictly controlled by a detector integration time, while a spatial sampling frequency is controlled by a uniform motion of an equipment conveying device. However, due to an influence of the load, the speed of the equipment conveying device fluctuates, especially when the equipment conveying device stops and then resumes for some reason, the spatial sampling frequency and the temporal sampling frequency are not synchronous, resulting in a distortion or disorder of the reconstructed image.

SUMMARY

In view of this, according to the embodiments of the present disclosure, there is provided a method and a device for controlling an output beam of a ray machine in an imaging system, a CT imaging system, an electronic apparatus, a storage medium and a program product.

According to an aspect of the present disclosure, there is provided a method for controlling an output beam of a ray machine in an imaging system. The imaging system includes a ray machine, a detector, a conveying device and an encoder arranged on the conveying device. The method includes: receiving an encoder signal and a ray machine output beam signal, and initially synchronizing the encoder signal and the ray machine output beam signal; recording a coded value M of the encoder at moment $t_m$, and a coded value N of the encoder at moment $t_{m+1}$, where M, N, and m are integers; determining that a duration from the moment $t_m$ to the moment $t_{m+1}$ is an actual output beam time interval T of the ray machine, when it is determined that a difference value between the coded value M and the coded value N satisfies a preset value a, where a is an integer; determining a gap time $T_G$ in the actual output beam time interval T based on a preset output beam time interval $T_J$ of the imaging system and the actual output beam time interval T; and controlling the ray machine not to emit a beam within the gap time $T_G$.

According to the embodiments of the present disclosure, the method for controlling an output beam of a ray machine in an imaging system further includes: demarcating a conveying distance $S_0$ of the conveying device under a single change of the coded value; and controlling an output beam state of a target point in the ray machine according to a numerical relationship between the conveying distance $S_0$ and a sampling spacing S preset in the imaging system.

According to the embodiments of the present disclosure, when $S_0 \leq S$, in a single actual output beam time interval T, the ray machine is controlled to select a target point for an output beam in a present target point output beam sequence.

According to the embodiments of the present disclosure, when the ray machine is controlled to select a target point for an output beam in a present target point output beam sequence, the preset output beam time interval is $T_J = a * S_0 / v$, where v is a speed set in the conveying device.

According to the embodiments of the present disclosure, when $S_0 \geq S$, in a single actual output beam time interval T, the ray machine is controlled to select H target points for a continuous output beam in a present target point output beam sequence, and $H*S > S_0$ is satisfied.

According to the embodiments of the present disclosure, when the ray machine is controlled to select H target points for a continuous output beam in a present target point output beam sequence, the preset output beam time interval is $T_J = S_0 / (H*v)$, where v is a speed set in the conveying device.

According to the embodiments of the present disclosure, a position Z of an object to be scanned on the conveying device during an output beam of the H target points is determined based on the actual output beam time interval T.

According to the embodiments of the present disclosure, the determining a position Z of an object to be scanned on the conveying device during an output beam of the H target points based on the actual output beam time interval T includes: demarcating a first output beam when the encoder signal and the ray machine output beam signal are initially synchronized; and calculating $Z=(k-1)*S_0+T_J*S_0/(T_1+T_2)$, where $T_1$ is a duration of a $K-1_{th}$ output beam, and $T_2$ is a duration of a $K_{th}$ output beam.

According to the embodiments of the present disclosure, the determining a gap time $T_G$ in the actual output beam time interval T based on a preset output beam time interval $T_J$ of the imaging system and the actual output beam time interval T includes: $T_G = T - T_J$.

According to another aspect of the present disclosure, there is provided a device for controlling an output beam of a ray machine in an imaging system, including: a receiving module configured to receive an encoder signal and a ray machine output beam signal, and initially synchronize the encoder signal and the ray machine output beam signal; a counting module configured to record a coded value M of the encoder at moment $t_m$, and a coded value N of the encoder at moment $t_{m+1}$, where M, N, and m are integers; an actual output beam time interval determining module configured to determine that a duration from the moment $t_m$ to the moment $t_{m+1}$ is an actual output beam time interval T of the ray machine, when it is determined that a difference value between the coded value M and the coded value N satisfies a preset value a, a being an integer; a gap time determining module configured to determine a gap time $T_G$ in the actual output beam time interval T based on a preset output beam time interval $T_J$ of the imaging system and the actual output beam time interval T; and a ray machine controlling module configured to control the ray machine not to emit a beam within the gap time $T_G$.

According to the embodiments of the present disclosure, the device for controlling an output beam of a ray machine in an imaging system further includes: a first demarcating module configured to demarcate a conveying distance $S_0$ of a conveying device under a single change of the coded value; and a ray machine output beam state controlling module configured to control an output beam state of a target point in the ray machine according to a numerical relationship between the conveying distance $S_0$ and a sampling spacing S preset in the imaging system.

According to another aspect of the present disclosure, there is further provided a CT imaging system, including: a ray machine having at least one target point in the ray machine; a detector; a conveying device, an encoder being provided on a rotating shaft of the conveying device; a data collecting module configured to acquire data information collected by the detector; a data processing module configured to receive the data information uploaded by the data collecting module, and perform an image reconstruction according to the data information; a display module configured to display a result of the image reconstruction; and a device for controlling an output beam of a ray machine in an imaging system according to any one of the above.

According to the embodiments of the present disclosure, a position calculating module is further included and configured to determine a position Z of an object to be scanned on a conveying device during an output beam of H target points based on the actual output beam time interval T.

According to another aspect of the present disclosure, there is further provided an electronic apparatus, including: one or more processors; and a storage device configured to store one or more programs, wherein when the one or more programs are executed by the one or more processors, the one or more processors are caused to execute the method according to any one of the above.

According to another aspect of the present disclosure, there is further provided a computer-readable storage medium having an executable instruction stored thereon, the instruction, when executed by a processor, causing the processor to perform the method according to any one of the above.

According to another aspect of the present disclosure, there is further provided a computer program product, including a computer program, the computer program, when executed by a processor, implementing the method according to any one of the above.

BRIEF DESCRIPTION OF THE DRAWINGS

The above and other objectives, features and advantages of the present disclosure will become more apparent from the following description of the embodiments of the present disclosure with reference to the accompanying drawings. In the drawings, FIG. 1 schematically shows a flowchart of a method for controlling an output beam of a ray machine in an imaging system according to the embodiments of the present disclosure.

DETAILED DESCRIPTION OF EMBODIMENTS

Hereinafter, the embodiments of the present disclosure will be described with reference to the accompanying drawings. However, it should be understood that these descriptions are exemplary only, and are not intended to limit the scope of the present disclosure. In the following detailed description, for convenience of explanation, numerous specific details are set forth in order to provide a thorough understanding of the embodiments of the present disclosure. However, it will be apparent that one or more embodiments may be implemented without these specific details. In addition, in the following description, descriptions of well-known structures and technologies are omitted to avoid unnecessarily obscuring the concepts of the present disclosure.

The terms used here are only for the purpose of describing particular embodiments and are not intended to limit the present disclosure. The terms "comprise", "include" and the like used here indicate the presence of a features, a operation, an operation and/or a component, but do not exclude the presence or addition of one or more other features, operations, operations or components.

When an expression like "at least one of A, B, or C" is used, it should generally be interpreted in accordance with the meaning of the expression commonly understood by those skilled in the art (e.g., "a system having at least one of A, B, or C" should include, but not be limited to a system having A only, having B only, having C only, having A and B, having A and C, having B and C, and/or having A, B and C). The terms "first" and "second" are only used for descriptive purposes, and should not be construed as indicating or implying relative importance or impliedly indicating the quantity of technical features indicated. Therefore, features defined with "first" and "second" may expressly or impliedly include one or more of said features.

The detailed background technology may include other technical problems in addition to the technical problems to be solved by the independent claims.

In the field of radiation imaging, when a static CT scanning system with a distributed light source is used, a position of a target point of the light source is fixed and unchanged, and a control system controls the target point for a quick switch and output beam. The positions of a light source and a detector of a static CT are fixed and unchanged, and a very small error may occur after a geometric demarcation is performed. If a CT detector performs sampling at a fixed time interval, a scanned object moves along a conveyor belt, and a speed fluctuation of the conveyor belt will cause an erroneous coordinate position of the object in a conveying direction.

In a static CT system with a single scan plane, a belt speed fluctuation may cause a distortion of a reconstructed image.

In a static CT system with multiple scan planes, a belt speed fluctuation may result in disorder of reconstruction data. Especially when the conveyor belt is stopped and then resumed, the distortion or disorder of an image will be more obvious, which will seriously affect the accuracy of an image judgment.

The inventor found out that there are generally two approaches to deal with the above belt speed fluctuation.

The first approach is to restore a package to a position of a uniform motion by rewinding, and then reconstruct an image according to a uniform speed state. But the operation of this approach is relatively complicated, and a high control accuracy of the conveying device is required.

The second approach is to demarcate a position of a package of each output beam by coding. This approach is easy to make the number of reconstructed viewing angles of different slices vary greatly, resulting in an image difference.

In view of the above problems, according to the embodiments of the present disclosure, there is provided a method for controlling an output beam of a ray machine in an imaging system. The imaging system includes a ray machine, a detector, a conveying device and an encoder arranged on the conveying device. The method includes: receiving an encoder signal and a ray machine output beam signal, and initially synchronizing the encoder signal and the ray machine output beam signal; recording a coded value M of the encoder at moment $t_m$, and a coded value N of the encoder at moment $t_{m+1}$, where M, N, and m are integers; determining that a duration from the moment $t_m$ to the moment $t_{m+1}$ is an actual output beam time interval T of the ray machine, when it is determined that a difference value between the coded value M and the coded value N satisfies a preset value a, a being an integer; determining a gap time $T_G$ in the actual output beam time interval T based on a preset output beam time interval $T_J$ of the imaging system and the actual output beam time interval T; and controlling the ray machine not to emit a beam within the gap time $T_G$.

In the embodiments of the present disclosure, the output beam time of the ray machine is determined in a manner that the coded value of the encoder changes by a value which is the same as the duration for the change. When the speed of the conveying device decreases, the duration for the change which is the same as the value by which the coded value changes increases. Accordingly, the ray machine is controlled not to output a beam within the gap time by calculating the increased duration to increase the gap time in the actual output beam time interval of the ray machine, thereby achieving an equidistant output beam of the ray machine, so as to avoid the problem of a sampling image disorder caused by an overlapping of the target point output beam time.

Figure 1:
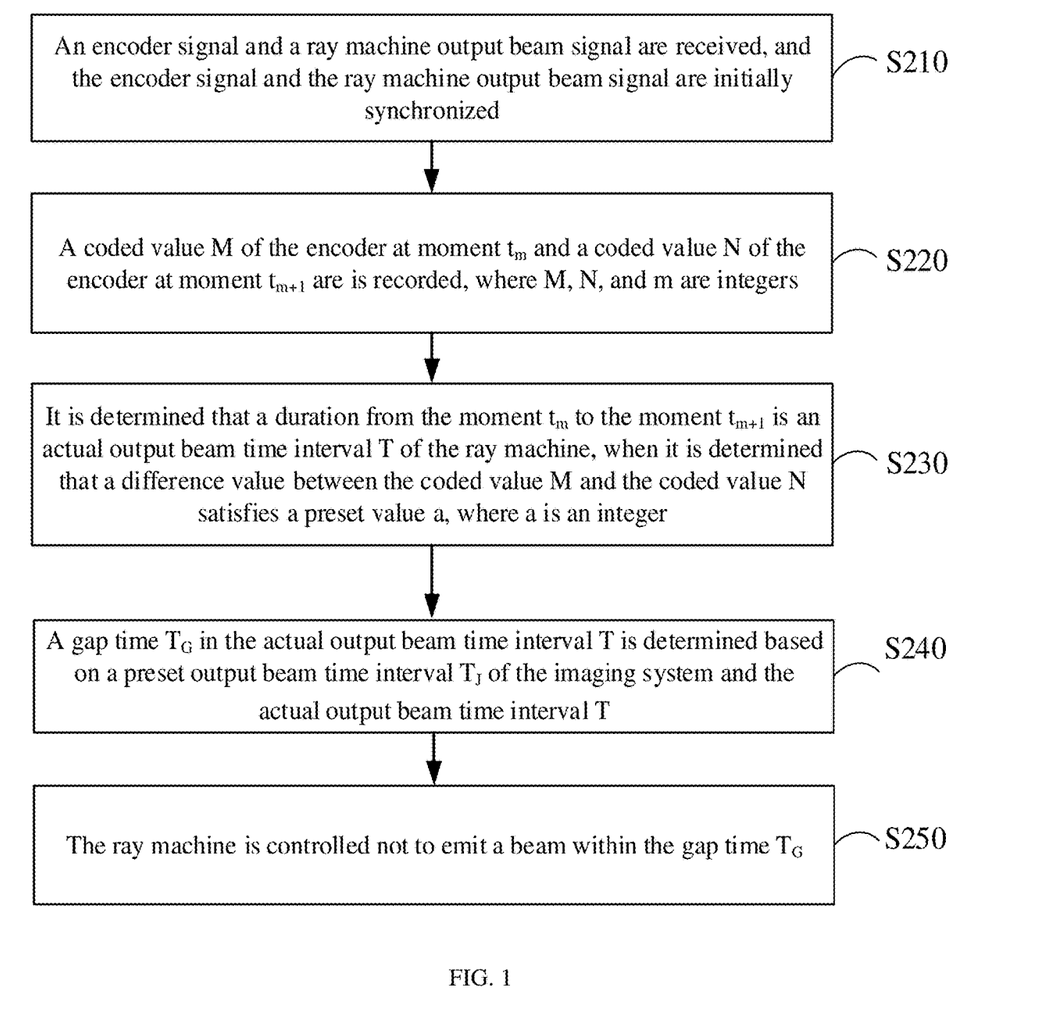

FIG. 1 schematically shows a flow chart of a method for controlling an output beam of a ray machine in an imaging system according to an embodiment of the present disclosure.

As shown in FIG. 1, the method for controlling an output beam of a ray machine in an imaging system according to this embodiment of the present disclosure includes operation S210 to operation S250.

In operation 210, an encoder signal and a ray machine output beam signal are received, and the encoder signal and the ray machine output beam signal are initially synchronized.

It should be noted that the usage scenario of the method in the embodiments of the present disclosure is a static CT scanning system with a distributed light source. A static CT scanning system with a distributed light source basically includes a ray machine, a detector and a conveying device. The ray machine and the detector are fixed and unchanged, and a scanning region is formed in a certain region of the conveying device. The conveying device is responsible for conveying an object to be detected to the scanning region. A plurality of target points are set in the ray machine. The target points may emit X-rays for scanning an object. The plurality of target points may be set at intervals along a conveying direction. When an object is scanned, different target points perform an output beam action in a certain sequence according to scanning requirements.

It may be understood that a ray machine output beam signal described in the present text is an output beam signal of a target point described above.

It may be understood that according to the basic principle of radiation imaging, a ray emitted by the ray machine is received by the detector, and the system controls the output beam action of the ray machine to synchronize with the receiving action of the detector to ensure the quality of imaging. The synchronization of the output beam action of the ray machine with the receiving action of the detector may be a default operation of the system. Therefore in the present text, a representative description is made only using the ray machine output beam signal to make the illustration concise.

In the embodiments of the present disclosure, the encoder is set on the conveying device. For example, the conveying device may be a belt conveyor, and the encoder may be installed on a driving roller of the belt conveyor to detect an angular velocity of the driving roller, thereby calculating a moving speed, a moving distance etc. of the detected object on the conveying device.

It may be understood that the encoder may be of a code disc type, a code ruler type, or the like.

It may be understood that a background server or a system general controller receives the encoder signal and the ray machine output beam signal. On the basis that in the present disclosure an output beam situation of the ray machine is determined through the encoder signal fed back by the encoder, it is necessary to ensure the synchronization of the encoder signal with the ray machine signal. The synchronization of the encoder signal with the ray machine signal may be achieved by controlling start-up signals of the encoder and the ray machine.

In operation 220, a coded value M of the encoder at moment $t_m$ and a coded value N of the encoder at moment $t_{m+1}$ are is recorded, where M, N, and m are integers.

It may be understood that, when an encoder of a code disc type is taken as an example, the encoder converts an angular displacement into a periodic electrical signal, and then converts the electrical signal into a count pulse, and a quantity of count pulses is used to represent a displacement value. A zero pulse is used to demarcate a zero reference position of the encoder and the position of the detected object on the conveying device at the zero reference position. For example, at the zero reference position, the first target point in the ray machine emits a beam, and moment to is demarcated at a time cycle.

In the embodiments of the present disclosure, a single change of a coded value is used to define a unit moving distance of a detected object. For example, when the object moves 10 mm, the coded value changes by 1. At different moments, the detected object is driven by the conveying device to move, and the coded value increases by one for every 10 mm increase in the moving distance of the object.

In operation S230, it is determined that a duration from the moment $t_m$ to the moment $t_{m+1}$ is an actual output beam time interval T of the ray machine, when it is determined that a difference value between the coded value M and the coded value N satisfies a preset value a, where a is an integer.

In the embodiments of the present disclosure, when a change amount of the coded value of the encoder reaches the preset value a, it means that the detected object reaches a preset distance of the system. The actual output beam time interval T of the ray machine may be obtained by calculating a time required for a change of the coded value.

In operation S240, a gap time $T_G$ in the actual output beam time interval T is determined based on a preset output beam time interval $T_J$ of the imaging system and the actual output beam time interval T.

It may be understood that in an ideal state, after a preset time interval of an actual output beam, the ray machine emits a beam with a second target point according to the sequence. At the same time, the conveying device needs to convey the detected object by a preset distance, but when the belt speed fluctuates, the conveying device does not move by the preset distance, after the ray machine outputs a beam at the preset time interval of the output beam.

It may be understood that when the belt speed fluctuates, the duration required for conveying the detected object by the preset distance increases, which is represented by the gap time $T_G$ above, and therefore $T_G=T-T_J$.

Figure 4:
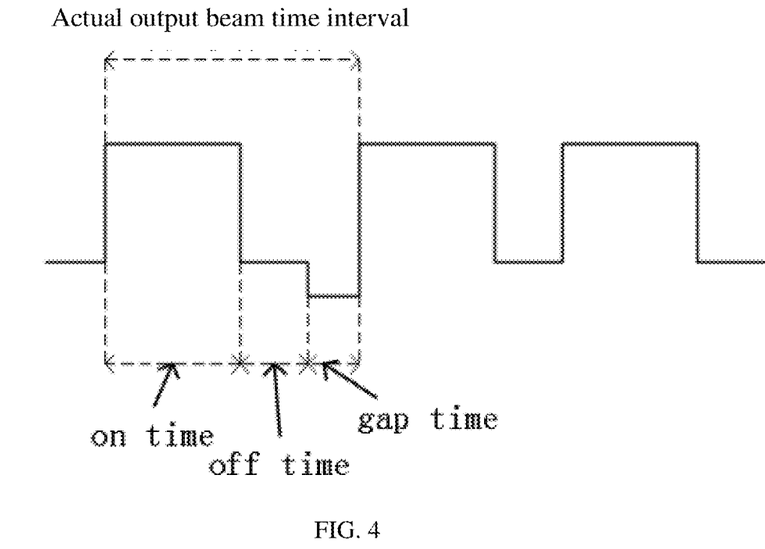
FIG. 4 schematically shows a schematic diagram of an actual output beam time interval of a ray machine output beam signal in a method for controlling an output beam of a ray machine in an imaging system according to the embodiments of the present disclosure.

As shown in FIG. 4, in the embodiments of the present disclosure, the actual output beam time interval of a single target point may be divided into three parts: on time, off time and gap time. On time and off time are fixed durations preset in the system, and respectively represent a stable dose interval and a rising and falling dose interval. Off time may be located on one side or both sides of on time, and a sum of on time and off time is the preset output beam time interval $T_J$ described above. When the belt speed is normal, the actual output beam time interval of the target point is only constituted by two parts: on time and off time. Gap time is the gap time $T_G$ described above. When the belt speed fluctuates, the gap time $T_G$ is increased in the actual output beam time interval of the target point.

In operation S250, the ray machine is controlled not to emit a beam within the gap time $T_G$.

In the embodiments of the present disclosure, the target point in the ray machine is controlled not to output a beam during the gap time.

Figure 2:
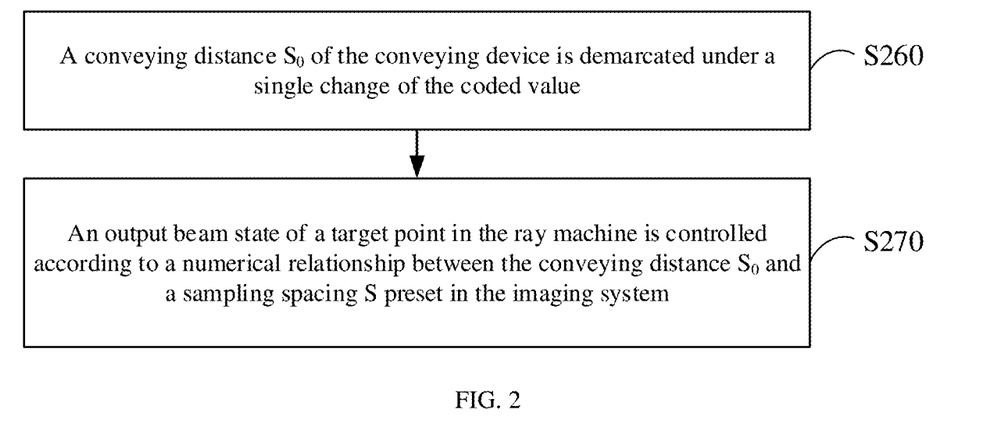
FIG. 2 schematically shows a flow chart of another implementation manner of a method for controlling an output beam of a ray machine in an imaging system according to the embodiments of the present disclosure.

FIG. 2 schematically shows a flow chart of another implementation manner of a method for controlling an output beam of a ray machine in an imaging system according to an embodiment of the present disclosure, including operations S260 to S270.

In operation S260, a conveying distance $S_0$ of the conveying device is demarcated under a single change of the coded value.

In operation S270, an output beam state of a target point in the ray machine is controlled according to a numerical relationship between the conveying distance $S_0$ and a sampling spacing S preset in the imaging system.

The output beam state of a target point in the ray machine is affected by the accuracy of the encoder as follows.

Figure 5:
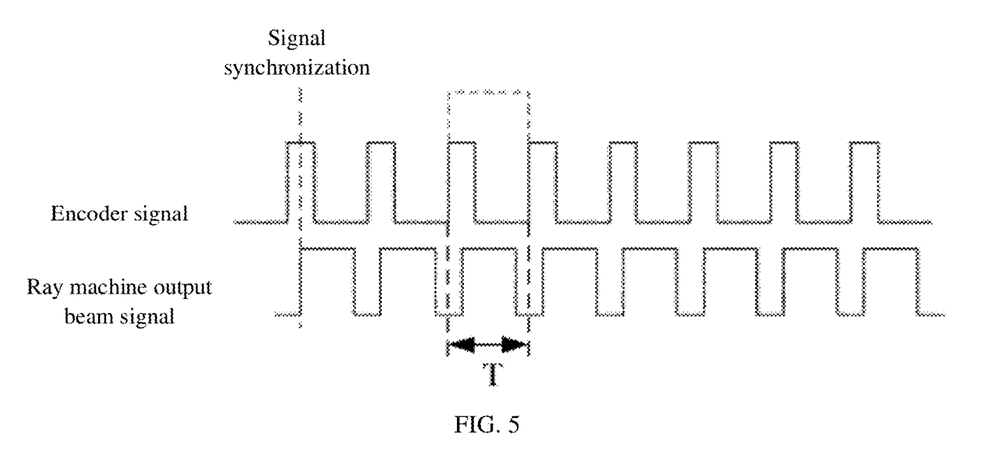
FIG. 5 schematically shows a schematic diagram of an encoder signal and a ray machine output beam signal in a method for controlling an output beam of a ray machine in an imaging system according to the embodiments of the present disclosure.
Figure 6:
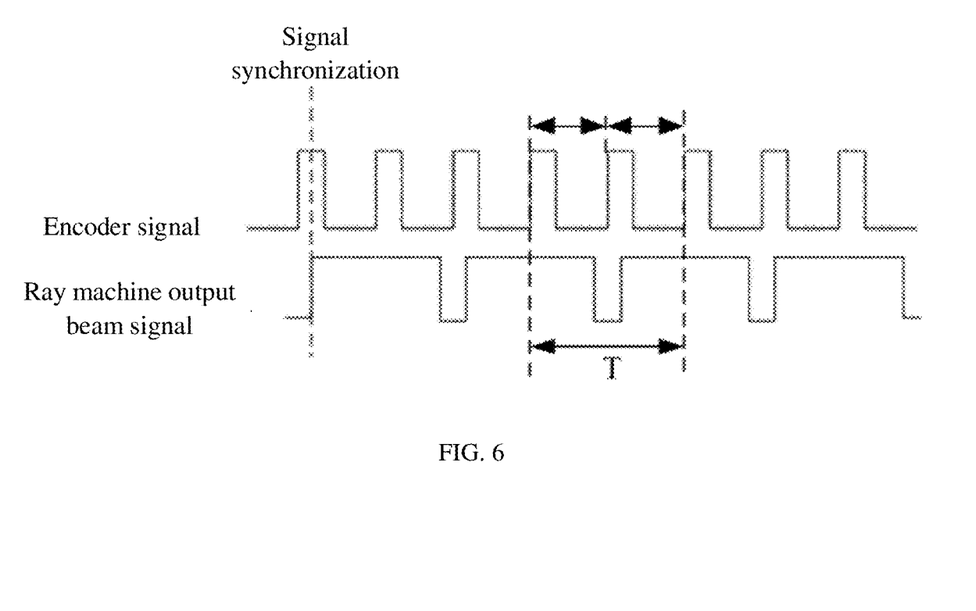
FIG. 6 schematically shows a schematic diagram of an encoder signal and a ray machine output beam signal in an imaging system according to the embodiments of the present disclosure.
Figure 7:
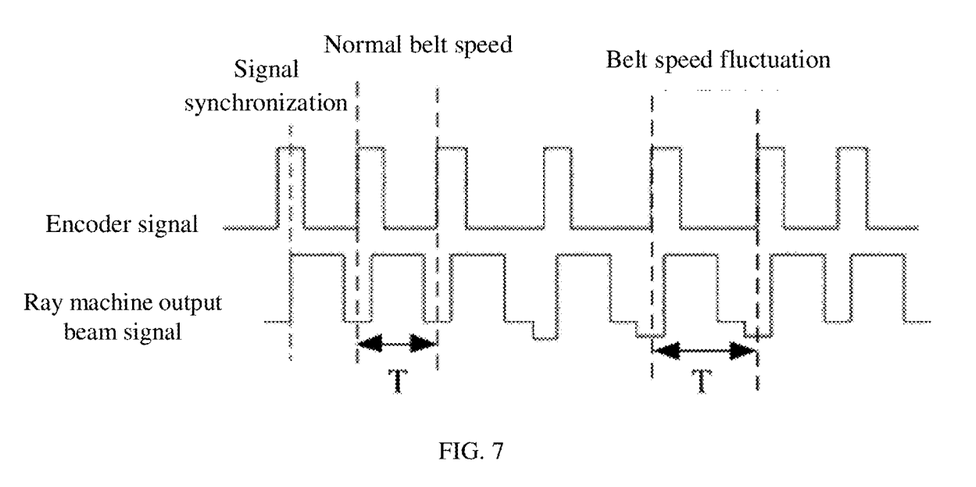
FIG. 7 schematically shows a schematic diagram of an encoder signal and a ray machine output beam signal in another implementation manner of a method for controlling an output beam of a ray machine in an imaging system according to the embodiments of the present disclosure.
Figure 8:
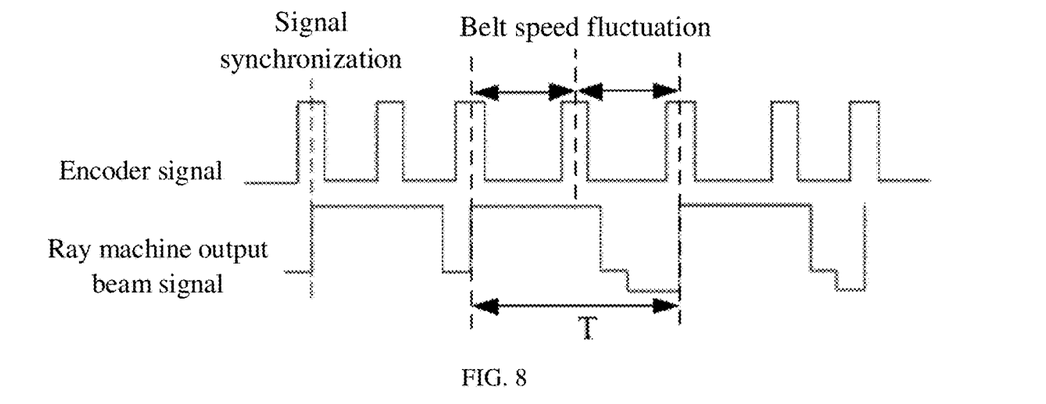
FIG. 8 schematically shows a schematic diagram of an encoder signal and a ray machine output beam signal in another implementation manner of a method for controlling an output beam of a ray machine in an imaging system according to the embodiments of the present disclosure.

When the $S_0 \leq S$, i.e., the encoder has a high precision, in a single actual output beam time interval T, the ray machine is controlled to select one target point for an output beam in a preset target point output beam sequence. For example, FIG. 5 and FIG. 6 show that in a uniform speed state, one or more encoder cycles may correspond to one actual output beam time interval of the ray machine, and FIG. 7 and FIG. 8 show that in a variable speed state, i.e., when the belt speed fluctuates, one or more encoder cycles may correspond to one actual output beam time interval of the ray machine.

In the embodiments of the present disclosure, when the ray machine is controlled to select a target point to output a beam in a preset output beam sequence of target points, the preset output beam time interval is $T_J=a*S_0/v$, where v is a speed set in the conveying device.

Figure 9:
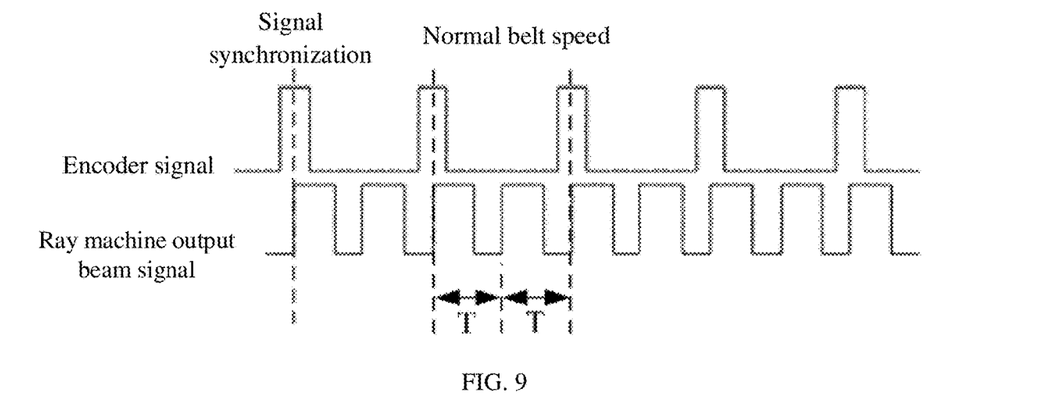
FIG. 9 schematically shows a schematic diagram of an encoder signal and a ray machine output beam signal in another implementation manner of a method for controlling an output beam of a ray machine in an imaging system according to the embodiments of the present disclosure.
Figure 10:
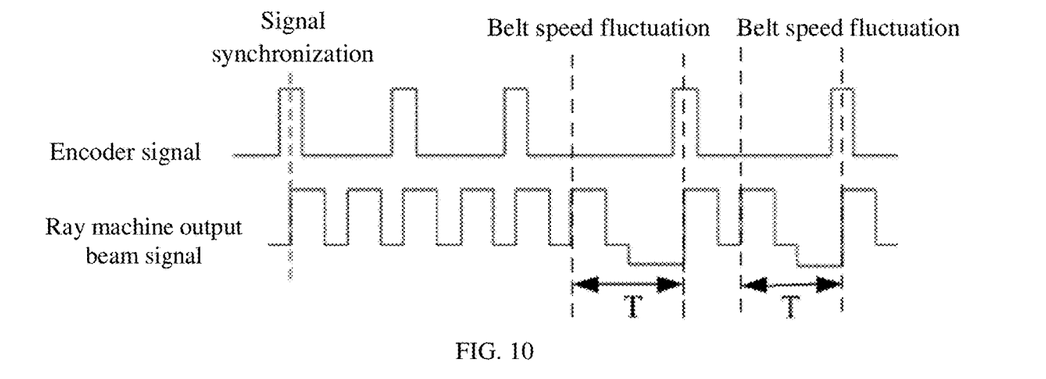
FIG. 10 schematically shows a schematic diagram of an encoder signal and a ray machine output beam signal in another implementation manner of a method for controlling an output beam of a ray machine in an imaging system according to the embodiments of the present disclosure.

When the $S_0 \geq S$, the encoder has a low precision. In a single actual output beam time interval T, the ray machine is controlled to select H target points for a continuous output beam in the preset target point output beam sequence, and $H*S>S_0$ is satisfied. For example, FIG. 9 shows that in a uniform speed state, one encoder cycle may correspond to two actual output beam time intervals of the ray machine, and FIG. 10 shows that in a variable speed state, i.e., when the belt speed fluctuates, one encoder cycle may correspond to two actual output beam time intervals of the ray machine.

When the ray machine is controlled to select H target points for a continuous output beam in the preset target point output beam sequence, the preset output beam time interval is $T_J=S_0/(H*v)$, where v is a speed set in the conveying device.

Figure 3:
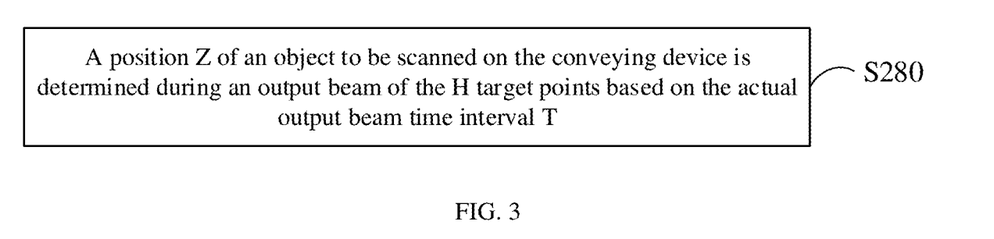
FIG. 3 schematically shows a flow chart of another implementation manner of a method for controlling an output beam of a ray machine in an imaging system according to the embodiments of the present disclosure.

FIG. 3 schematically shows a flow chart of another implementation manner of a method for controlling an output beam of a ray machine in an imaging system according to an embodiment of the present disclosure, including operation S280.

In operation S280, a position Z of an object to be scanned on the conveying device is determined during an output beam of the H target points based on the actual output beam time interval T.

In the embodiments of the present disclosure, for the situation of the encoder having a low precision, i.e., when $S_0 \geq S$, in order to further improve the quality of the reconstructed image, when each target point outputs a beam, a position coordinate of the object on the conveying device is precisely calculated according to the output beam time of the target point in the ray machine.

It is demarcated that when the encoder signal is initially synchronized with the ray machine output beam signal, a first output beam occurs. $Z=(k-1)*S_0+T_J*S_0/(T_1+T_2)$ is calculated, where $T_1$ is a duration of a $K-1_{th}$ output beam, $T_2$ is a duration of a $K_{th}$ output beam, and Z represents the position of the detected object on the conveying device.

Based on the above method for controlling an output beam of a ray machine in an imaging system, according to the embodiments of the present disclosure, there is further provided a device for controlling an output beam of a ray machine in an imaging system. The device will be described in detail below with reference to FIG. 11.

Figure 11:
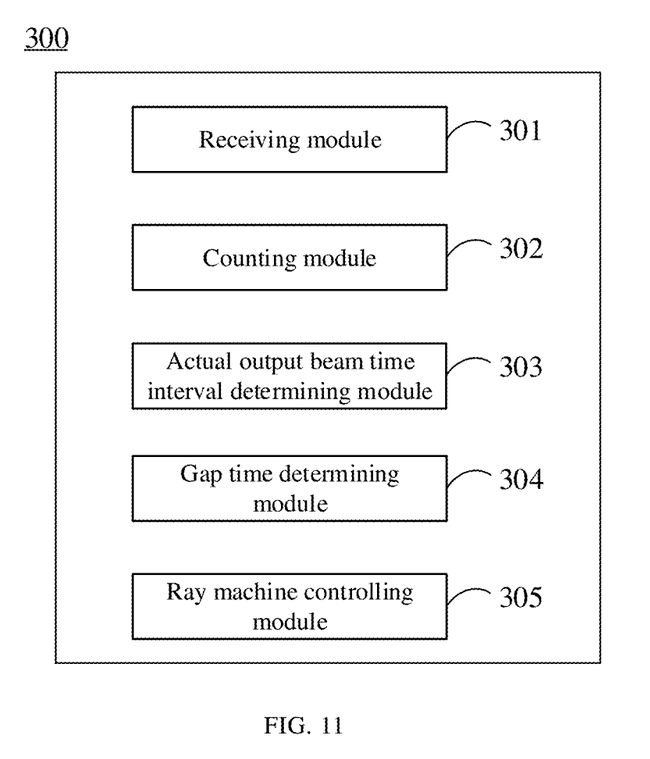
FIG. 11 schematically shows a structural block diagram of a device for controlling an output beam of a ray machine in an imaging system according to the embodiments of the present disclosure.

FIG. 11 schematically shows a structural block diagram of a device for controlling an output beam of a ray machine in an imaging system according to an embodiment of the present disclosure.

As shown in FIG. 11, the device 300 for controlling an output beam of a ray machine in an imaging system includes: a receiving module 301, a counting module 302, an actual output beam time interval determining module 303, a gap time determining module 304, and a ray machine controlling module 305.

The receiving module is used to receive an encoder signal and a ray machine output beam signal, and initially synchronize the encoder signal and the ray machine output beam signal. In an embodiment, the receiving module 301 may be used to perform the operation S210 described above, which is not repeated here.

The counting module 302 is used to record a coded value M of the encoder at moment $t_m$, and a coded value N of the encoder at moment $t_{m+1}$, where M, N, and m are integers. In an embodiment, the counting module 302 may be used to perform the operation S220 described above, which is not repeated here.

The actual output beam time interval determining module 303 is used to determine that a duration from the moment $t_m$ to the moment $t_{m+1}$ is an actual output beam time interval T of the ray machine, when it is determined that a difference value between the coded value M and the coded value N satisfies a preset value a, a being an integer. In an embodiment, the actual output beam time interval determining module 303 may be used to perform the operation S230 described above, which is not repeated here.

The gap time determining module 304 is used to determine a gap time $T_G$ in the actual output beam time interval T based on a preset output beam time interval $T_J$ of the imaging system and the actual output beam time interval T. In an embodiment, the gap time determining module 304 may be used to perform the operation S240 described above, which is not repeated here.

The ray machine controlling module 305 is used to control the ray machine not to emit a beam within the gap time $T_G$. In an embodiment, the ray machine controlling module 305 may be used to perform the operation S250 described above, which is not repeated here.

For example, the device for controlling an output beam of a ray machine in an imaging system according to the embodiments of the present disclosure further includes: a first demarcating module used to demarcate a conveying distance $S_0$ of a conveying device under a single change of the coded value; and a ray machine output beam state controlling module used to control an output beam state of a target point in the ray machine according to a numerical relationship between the conveying distance $S_0$ and a sampling spacing S preset in the imaging system.

For example, the device for controlling an output beam of a ray machine in an imaging system according to the embodiments of the present disclosure further includes: a position calculating module used to determine a position Z of an object to be scanned on a conveying device during an output beam of H target points based on the actual output beam time interval T.

According to the embodiments of the present disclosure, there is provided a method for controlling an output beam of a ray machine in an imaging system. The method includes: receiving an encoder signal and a ray machine output beam signal, and initially synchronizing the encoder signal and the ray machine output beam signal; recording a coded value M of the encoder at moment $t_m$, and a coded value N of the encoder at moment $t_{m+1}$, where M, N, and m are integers; determining that a duration from the moment $t_m$ to the moment $t_{m+1}$ is an actual output beam time interval T of the ray machine, when it is determined that a difference value between the coded value M and the coded value N satisfies a preset value a, where a is an integer; determining a gap time $T_G$ in the actual output beam time interval T based on a preset output beam time interval $T_J$ of the imaging system and the actual output beam time interval T; and controlling the ray machine not to emit a beam within the gap time $T_G$.

In the embodiments of the present disclosure, the output beam time of the ray machine is determined in a manner that the coded value of the encoder changes by a value which is the same as the duration for the change. When the speed of the conveying device decreases, the duration for the change which is the same as the value by which the coded value changes increases. Accordingly, the ray machine is controlled not to output a beam within the gap time by calculating the increased duration to increase the gap time in the actual output beam time interval of the ray machine, thereby achieving an equidistant output beam of the ray machine, so as to avoid the problem of a sampling image disorder caused by an overlapping of the target point output beam time.

According to the embodiments of the present disclosure, any number of modules from the receiving module 301, the counting module 302, the actual output beam time interval determining module 303, the gap time determining module 304, and the ray machine controlling module 305 may be combined into one module for implementation, or any one of these modules may be split into a plurality of modules. Alternatively, at least a portion of the functions of one or more of these modules may be combined with at least a portion of the functions of other modules for implementation in one module. According to the embodiments of the present disclosure, at least one of the receiving module 301, the counting module 302, the actual output beam time interval determining module 303, the gap time determining module 304, and the ray machine controlling module 305 may be at least partially implemented as a hardware circuit, such as a Field Programmable Gate Array (FPGA), a Programmable Logic Array (PLA), a System on Chip, a System on Substrate, a System on Package, and an Application Specific Integrated Circuit (ASIC), or may be implemented by a hardware or a firmware in any other reasonable manner of integrating or encapsulating a circuit, or by any one of or by an appropriate combination of more of a software, a hardware, and a firmware. Alternatively, at least one of the receiving module 301, the counting module 302, the actual output beam time interval determining module 303, the gap time determining module 304, and the ray machine controlling module 305 may be at least partially implemented as a computer program module, and the computer program module may execute a corresponding function, when it is operated.

According to the embodiments of the present disclosure, there is also provided a CT imaging system, including: a device for controlling an output beam of a ray machine in an imaging system according to the embodiments above, a ray machine having at least one target point in the ray machine; a detector; a conveying device, an encoder being provided on a rotating shaft of the conveying device; a data collecting module used to acquire data information collected by the detector; a data processing module used to receive the data information uploaded by the data collecting module, and perform an image reconstruction according to the data information; and a display module used to display a result of the image reconstruction.

Figure 12:
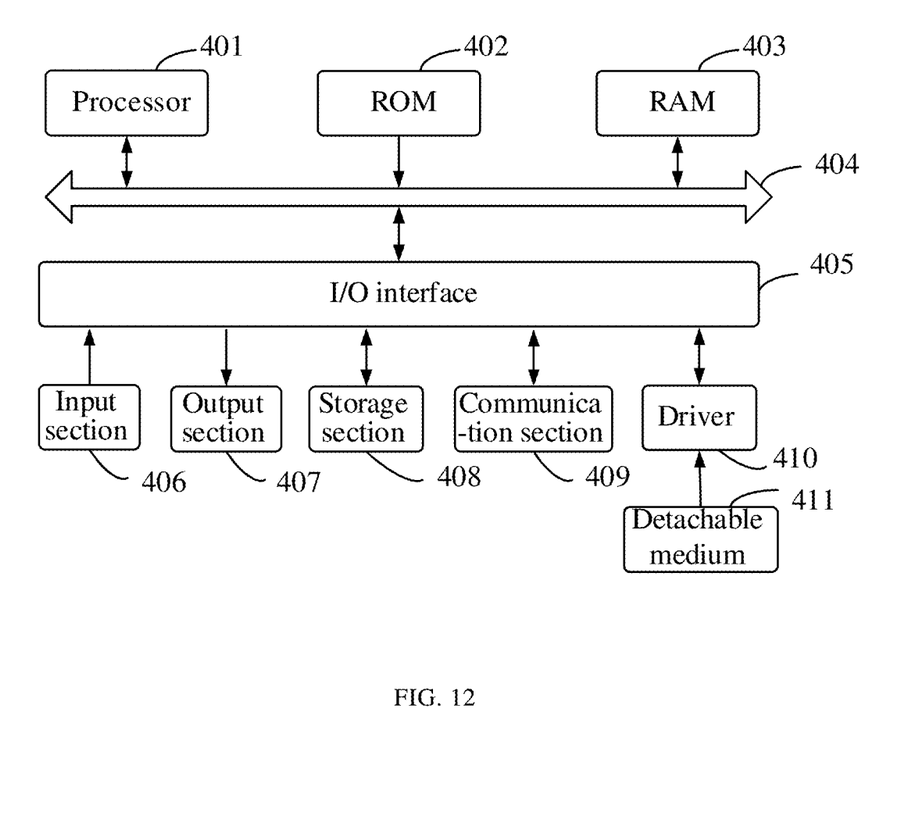
FIG. 12 schematically shows a block diagram of an electronic apparatus applicable for implementing a method for controlling an output beam of a ray machine in an imaging system according to the embodiments of the present disclosure.

FIG. 12 schematically shows a block diagram of an electronic apparatus applicable for implementing a method for splicing moving targets in a fixed view field according to an embodiment of the present disclosure.

As shown in FIG. 12, the electronic device 400 according to the embodiments of the present disclosure includes a processor 401 that may perform various appropriate actions and processes according to a program stored in a read-only memory (ROM) 402 or a program loaded from a memory section 408 into a random access memory (RAM) 403. The processor 401 may include, for example, a general-purpose microprocessor (e.g., a CPU), an instruction set processor and/or a related chipset, and/or a special-purpose microprocessor (e.g., an application-specific integrated circuit (ASIC)), and the like. The processor 401 may also include an on-board memory for a caching purpose. The processor 401 may include a single processing unit or multiple processing units for performing different actions of the method flow according to the embodiments of the present disclosure.

In the RAM 403, various programs and data necessary for an operation of the electronic apparatus 400 are stored. The processor 401, the ROM 402, and the RAM 403 are connected to one another through a bus 404. The processor 401 performs various operations of the method flow according to the embodiments of the present disclosure by executing the program in the ROM 402 and/or the RAM 403. It is noted that the program may also be stored in one or more memories other than the ROM 402 and the RAM 403. The processor 401 may also perform various operations of the method flow according to the embodiments of the present disclosure by executing programs stored in the one or more memories.

According to the embodiments of the present disclosure, the electronic apparatus 400 may further include an input/output (I/O) interface 405. The input/output (I/O) interface 405 is also connected to the bus 404. The electronic apparatus 400 may also include one or more of the following components connected to the I/O interface 405: an 1 406 including a keyboard, a mouse, etc.; an output section 407 including a cathode ray tube (CRT), a liquid crystal display (LCD), a speaker, etc.; a storage section 408 including a hard disk and the like; and a communication section 405 including a network interface card such as a LAN card and a modem. The communication section 405 performs a communication processing via a network such as the Internet. A driver 410 is also connected to the I/O interface 405 as needed. A detachable medium 411, such as a magnetic disk, an optical disk, a magneto-optical disk and a semiconductor memory, is installed on the driver 410 as needed, so that the computer program read therefrom is installed into the storage section 408 as needed.

According to the present disclosure, there is also provided a computer-readable storage medium. The computer-readable storage medium may be included in the device/apparatus/system described in the above embodiments. It may also exist alone without being assembled into the device/apparatus/system. The above computer-readable storage medium carries one or more programs, and when the above one or more programs are executed, the method according to the embodiments of the present disclosure is implemented.

According to the embodiments of the present disclosure, the computer-readable storage medium may be a non-volatile computer-readable storage medium, for example, including but not limited to, a portable computer disk, a hard disk, a random access memory (RAM), a read only memory (ROM), an erasable programmable read only memory (EPROM or a flash memory), a portable compact disk read only memory (CD-ROM), an optical storage device, a magnetic storage devices, or any suitable combination of the above. In the embodiments of the present disclosure, a computer-readable storage medium may be any tangible medium that contains or stores a program. The program may be used by or in combination with an instruction execution system, an apparatus, or a device. For example, according to the embodiments of the present disclosure, a computer-readable storage medium may include one or more memories other than the ROM 402 and/or the RAM 403 and/or the ROM 402 and the RAM 403 described above.

According to the embodiments of the present disclosure, there is further provided a computer program product including a computer program, the computer program containing a program code for performing the method illustrated in the flowchart. When the computer program product runs in a computer system, the program code is used to cause the computer system to implement the item recommendation method provided in the embodiments of the present disclosure.

The computer program performs the above functions defined in the system/apparatus of the embodiments of the present disclosure, when it is executed by the processor 401. According to the embodiments of the present disclosure, the system, apparatus, module, unit, etc. described above may be implemented by a computer program module.

In an embodiment, the computer program may rely on a tangible storage medium such as an optical storage device and a magnetic storage device. In another embodiment, the computer program may also be transmitted and distributed in the form of a signal over a network medium, and downloaded and installed through the communication section 405, and/or installed from the detachable medium 411. The program code contained in the computer program may be transmitted using any suitable network medium, including but not limited to: a wireless network medium, a wired network medium, etc., or any suitable combination of the above.

In such an embodiment, the computer program may be downloaded and installed from the network via the communication section 405 and/or installed from the detachable medium 411. When the computer program is executed by the processor 401, the above functions defined in the system of the embodiments of the present disclosure are performed. According to the embodiments of the present disclosure, the above system, apparatus, device, module, unit, etc. may be implemented by a computer program module.

According to the embodiments of the present disclosure, the program code for executing the computer program provided in the embodiments of the present disclosure may be written in any combination of one or more programming languages. Specifically, advanced procedures and/or object-oriented programming languages, and/or assembly/machine languages may be used to implement these computing programs. Programming languages include, but are not limited to, languages such as Java, C++, python, "C" language or similar programming languages. The program code may be executed entirely on a user computing device, partially on the user device, partially on a remote computing device, or entirely on a remote computing device or server. When a remote computing device is involved, the remote computing device may be connected to a user computing device over any kind of network, including a local area network (LAN) or a wide area network (WAN), or may be connected to an external computing device (for example, connection over the Internet using an Internet service provider).

The flowcharts and block diagrams in the drawings illustrate the architectures, functions, and operations that may be achieved by the system, method and computer program product according to various embodiments of the present disclosure. In this regard, each block in the flowcharts or block diagrams may represent a module, a program segment, or a portion of a code, the above module, program segment, or portion of the code includes one or more executable instructions for implementing specified logical functions. It should also be noted that, in some alternative implementations, the functions noted in the blocks may occur in a sequence different from the sequence as noted in the figures. For example, two blocks shown in a successive manner may be actually executed substantially concurrently, or the blocks may be sometimes executed in a reverse sequence depending on the function involved. It should also be noted that each block in the block diagrams or flowcharts and combinations of blocks in the block diagrams or flowcharts may be achieved by a dedicated hardware-based system for executing specified functions or operations.

Those skilled in the art may understand that various combinations and/or incorporations of features recited in various embodiments and/or claims of the present disclosure may be made, even if such combinations or incorporations are not explicitly recited in the embodiments of the present disclosure. In particular, various combinations and/or incorporations of the features recited in various embodiments and/or claims of the present disclosure may be made without departing from the spirits and teachings of the present disclosure. All such combinations and/or incorporations fall within the scope of the present disclosure.

The embodiments of the present disclosure have been described above. However, these examples are only for illustrative purposes, and are not intended to limit the scope of the present disclosure. Although various embodiments are described above separately, this does not mean that the measurements in various embodiments may not be advantageously used in combination. The scope of the present disclosure is defined by the appended claims and the equivalents thereof. Without departing from the scope of the present disclosure, those skilled in the art may make various substitutions and modifications, and these substitutions and modifications should all fall within the scope of the present disclosure.

What is claimed is:

1. A method for controlling an output beam of a ray machine in an imaging system, the imaging system comprising a ray machine, a detector, a conveying device and an encoder arranged on the conveying device, and the method comprising:
   receiving an encoder signal and a ray machine output beam signal, and initially synchronizing the encoder signal and the ray machine output beam signal;
   recording a coded value M of the encoder at moment $t_m$ and a coded value N of the encoder at moment $t_{m+1}$, where M, N, and m are integers;
   determining that a duration from the moment $t_m$ to the moment $t_{m+1}$ is an actual output beam time interval T of the ray machine, when it is determined that a difference value between the coded value M and the coded value N satisfies a preset value a, a where a is an integer;
   determining a gap time $T_G$ in the actual output beam time interval T based on a preset output beam time interval $T_J$ of the imaging system and the actual output beam time interval T; and
   controlling the ray machine not to emit a beam within the gap time $T_G$.

2. The method according to claim 1, further comprising:
   demarcating a conveying distance $S_0$ of the conveying device under a single change of the coded value; and
   controlling an output beam state of a target point in the ray machine according to a numerical relationship between the conveying distance $S_0$ and a sampling spacing S preset in the imaging system.

3. The method according to claim 2, wherein when $S_0 \leq S$, in a single actual output beam time interval T, the ray machine is controlled to select a target point for an output beam in a present target point output beam sequence.

4. The method according to claim 3, wherein when the ray machine is controlled to select a target point for an output beam in a present target point output beam sequence, the preset output beam time interval is $T_J = a*S_0/v$, where v is a speed set in the conveying device.

5. The method according to claim 2, wherein when $S_0 \geq S$, in a single actual output beam time interval T, the ray machine is controlled to select H target points for a continuous output beam in a present target point output beam sequence, and $H*S > S_0$ is satisfied.

6. The method according to claim 5, wherein when the ray machine is controlled to select H target points for a continuous output beam in a present target point output beam sequence, the preset output beam time interval is $T_J = S_0/(H*v)$, where v is a speed set in the conveying device.

7. The method according to claim 5, further comprising:
   determining a position Z of an object to be scanned on the conveying device during an output beam of the H target points, based on the actual output beam time interval T.

8. The method according to claim 7, wherein the determining a position Z of an object to be scanned on the conveying device during an output beam of the H target points based on the actual output beam time interval T comprises:
   demarcating a first output beam when the encoder signal and the ray machine output beam signal are initially synchronized; and
   calculating $Z=(k-1)*S_0+T_J*S_0/(T_1+T_2)$, where $T_1$ is a duration of a $K-1_{th}$ output beam, and $T_2$ is a duration of a $K_{th}$ output beam.

9. The method according to claim 1, wherein the determining a gap time $T_G$ in the actual output beam time interval T based on a preset output beam time interval $T_J$ of the imaging system and the actual output beam time interval T comprises:

$$T_G = T - T_J.$$

10. An electronic apparatus, comprising:
   one or more processors; and
   a storage device configured to store one or more programs, wherein when the one or more programs are executed by the one or more processors, the one or more processors are caused to execute the method according to claim 1.

11. A computer-readable storage medium having an executable instruction stored thereon, the instruction, when executed by a processor, causing the processor to perform the method according to claim 1.

12. A computer program product, comprising a computer program, the computer program, when executed by a processor, implementing the method according to claim 1.

13. A device for controlling an output beam of a ray machine in an imaging system, comprising:
 a receiving module configured to receive an encoder signal and a ray machine output beam signal, and initially synchronize the encoder signal and the ray machine output beam signal;
 a counting module configured to record a coded value M of the encoder at moment $t_m$, and a coded value N of the encoder at moment $t_{m+1}$, where M, N, and m are integers;
 an actual output beam time interval determining module configured to determine that a duration from the moment $t_m$ to the moment $t_{m+1}$ is an actual output beam time interval T of the ray machine, when it is determined that a difference value between the coded value M and the coded value N satisfies a preset value a, where a is an integer;
 a gap time determining module configured to determine a gap time $T_G$ in the actual output beam time interval T based on a preset output beam time interval $T_J$ of the imaging system and the actual output beam time interval T; and
 a ray machine controlling module configured to control the ray machine not to emit a beam within the gap time $T_G$.

14. The device according to claim 13, further comprising:
 a first demarcating module configured to demarcate a conveying distance $S_0$ of a conveying device under a single change of the coded value; and
 a ray machine output beam state controlling module configured to control an output beam state of a target point in the ray machine according to a numerical relationship between the conveying distance $S_0$ and a sampling spacing S preset in the imaging system.

15. The device according to claim 13, further comprising:
 a position calculating module configured to determine a position Z of an object to be scanned on a conveying device during an output beam of H target points based on the actual output beam time interval T.

16. A CT imaging system, comprising:
 a ray machine having at least one target point in the ray machine;
 a detector;
 a conveying device, an encoder being provided on a rotating shaft of the conveying device;
 a data collecting module configured to acquire data information collected by the detector;
 a data processing module configured to receive the data information uploaded by the data collecting module, and perform an image reconstruction according to the data information;
 a display module configured to display a result of the image reconstruction; and
 a device for controlling an output beam of a ray machine in an imaging system according to claim 13.

* * * * *